United States Patent [19]

Peck

[11] 4,025,171
[45] May 24, 1977

[54] APPARATUS FOR PARFOCALIZING OBJECTIVES

[75] Inventor: Theodore H. Peck, Irondequoit, N.Y.

[73] Assignee: Bausch & Lomb Incorporated, Rochester, N.Y.

[22] Filed: Feb. 17, 1976

[21] Appl. No.: 658,201

[52] U.S. Cl. .............................................. 350/255
[51] Int. Cl.² ........................................ G02B 7/02
[58] Field of Search ................ 350/39, 41, 42, 44, 350/46, 47, 186, 187, 252, 254, 255, 257

[56] References Cited

UNITED STATES PATENTS

| 2,116,704 | 5/1938 | Laube et al. | 350/255 |
| 3,058,391 | 10/1962 | Leupold | 350/42 X |

FOREIGN PATENTS OR APPLICATIONS

| 197,096 | 4/1958 | Austria | 350/255 |

Primary Examiner—Edward S. Bauer
Assistant Examiner—F. L. Evans
Attorney, Agent, or Firm—Frank C. Parker; DeWitt M. Morgan

[57] ABSTRACT

An objective, for use with an optical instrument such as a microscope, includes a housing formed of two generally tubular shaped members, one of which is coaxially and slidably mounted within the other. The objective also includes a rotatable member supported on the side of the outer of the two tubular members. An eccentric provided on the end of the rotatable member cooperates with a surface of a slot formed on the side of the inner of the two tubular members. By rotating the eccentric, the inner tubular member is coaxially moved relative to the outer tubular member to thereby provide an easy and extremely accurate method of parfocalizing the objective. A locking mechanism is also provided to insure that the parfocality of the objective is not disrupted once it has been set.

4 Claims, 4 Drawing Figures

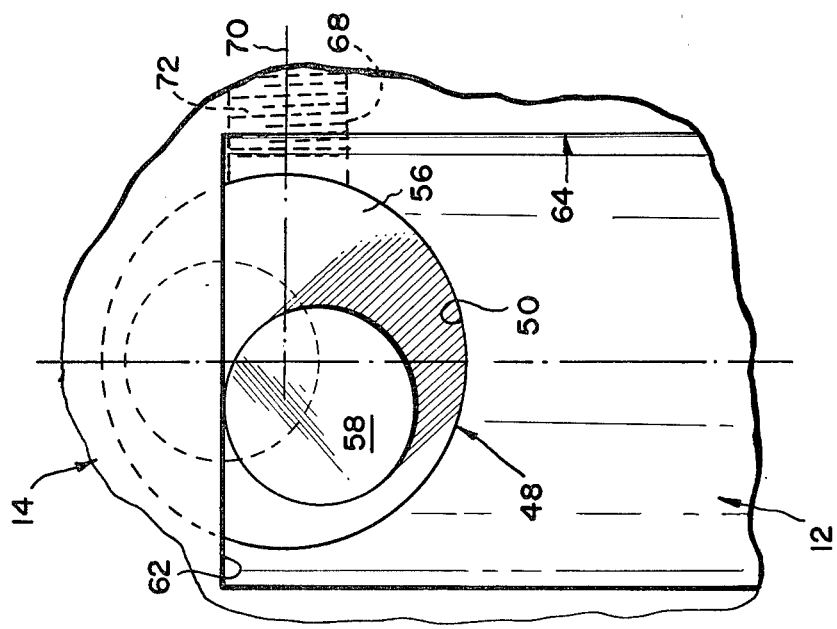
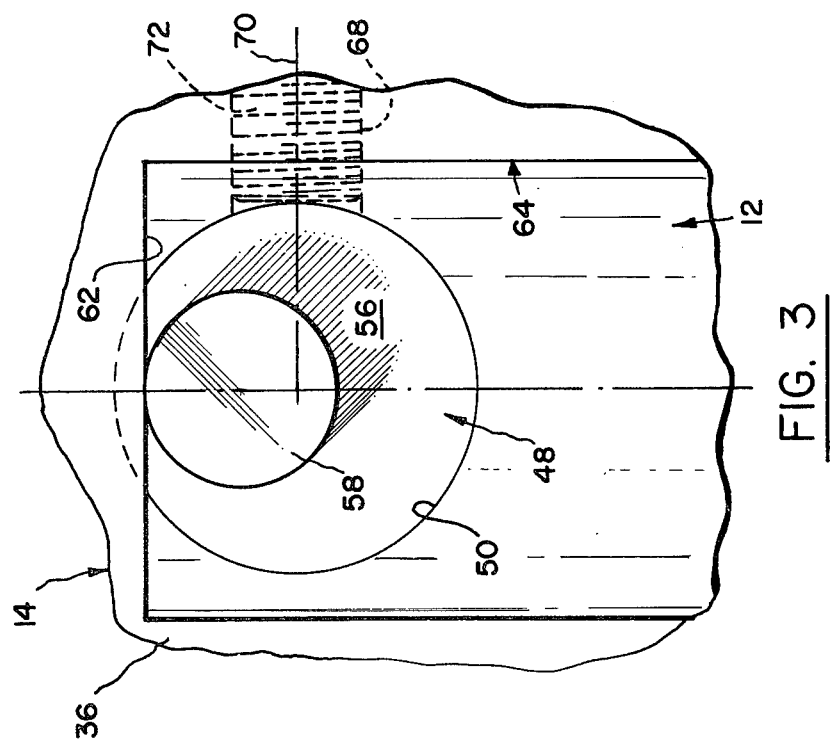

APPARATUS FOR PARFOCALIZING OBJECTIVES

BACKGROUND OF THE INVENTION

A plural objective microscope includes, among other structure, a rotatable nosepiece to which is secured a series of objectives of different power. Objective, as used herein, includes, but is not limited to, the "semi-objectives" such as disclosed in U.S. Pat. No. 3,481,665 and 3,583,789. The provision of a plurality of objectives permits the microscope operator to selectively bring any one of the objectives into alingment for use in viewing a slide, or other object, upon which the optical system is to be focused.

Typically, an objective includes a generally tubular shaped housing having at one of its ends a series of threads adapted for engagement with mating threads provided on the rotatable nosepiece. The objective housing also includes, adjacent to the threaded portion thereof, a shoulder which, when the objective is secured to the nosepiece, is in engagement with a mating shoulder or surface provided on the nosepiece. A lens, or series of lenses, is positioned within the objective housing by appropriately configured and dimensioned lens supporting cells and spacers.

In higher power objectives, which are generally longer than lower power objectives and have very small working distances, the housing may be formed of two generally cylindrically shaped members. The first or outer member includes the threaded end-cooperating shoulder arrangement for receiving and positioning the objective relative to the rotatable nosepiece. The second or inner member, which supports the lens elements, is partially and slidably received within the outer member. In such an arrangement the inner member is provided with a shoulder which is held in engagement with an inwardly extending flange, provided on the outer member, by means of a spring member. This arrangement permits the inner member to retract, against the pressure of the spring, into the outer member and, thereby, prevent damage to either the specimen or the objective during focusing within the small working distance.

In a series of objectives such as those carried by the usual rotatable nosepiece of a microscope it is desirable that all the objectives be selectively positioned to view an object without changing the focus adjustment of the microscope. The object, therefore, remains in focus for all the objectives provided on the nosepiece without changing the relative position of the object to the nosepiece or the nosepiece to the eyepiece. When the series of objectives mounted on the nosepiece functions in this manner, they are said to be parfocal.

To achieve parfocality, the most generally accepted procedure is to machine the shoulder provided adjacent the threaded end of the objective housing. This alters the position of the lens system carried by the housing relative to both the stage and the eyepiece of the microscope. This is a generally tedious and time consuming operation which can only be done satisfactorily at the factory. Another generally accepted procedure to achieve parfocality, usable either by itself or in combination with machining, is the addition or subtraction of spacers between the shoulder of the objective and the mating shoulder or surface provided on the nosepiece. In either case, once parfocality has been achieved for a series of objectives on the nosepiece, they were locked into that position and the entire assembly sent to the ultimate user.

Alternate ways of achieving parfocality for a series of objectives are disclosed in U.S. Pat. Nos. 1,557,503 and 1,889,794. In U.S. Pat. No. 1,557,503 parfocality is achieved by forming the objective housing in two parts which are adjustable relative to each other by means of a series of threads. A sleeve, the correct length of which is determined at the time of assembling the objective, is inserted inside the objective to fix the position of the two parts of the housing relative to each other. The objective disclosed in U.S. Pat. No. 1,889,794, like the objective disclosed in U.S. Pat. No. 1,557,503, includes a two part housing. Parfocality in this case is achieved by selectively rotating the two parts of the housing relative to each other to obtain the correct position. This position is then fixed by use of an inner cylindrical spacing member in cooperation with a retaining nut. threadably received within the housing to hold all the parts in the desired position.

Another method of achieving parfocality is particularly adapted to higher power objectives wherein the objective housing is composed of two generally tubular members and wherein one of the tubular members is slidably received within the other tubular member. In place of the fixed flange or shoulder normally provided on the outer member, against which a shoulder provided on the inner member is held in engagement by means of a suitable spring member, an adjustable collar is threadably received in the lower end of the outer member. With this arrangement, parfocality is achieved by rotating the collar relative to the outer member which, in turn, determines the non retracted position of the inner member relative to the outer member. Collar rotation is affected by a special spanner. Once adjusted, the collar is locked in place by a suitable cement to prevent rotation and, hence, loss of parfocality. Cementing is necessary to prevent collar rotation induced by repeated engagement of the shoulder on the inner member against the stop surface provided on the collar.

The above-described methods of achieving parfocality have the disadvantage in that parfocality is set at the factory and cannot easily be adjusted in the field by the ultimate user. Thus, replacement of objectives is best handled by the factory or, in the field, by specially trained personnel. U.S. Pat. No. 2,195,657 describes apparatus which permits setting and/or adjusting parfocality in the field without the use of spacers, machining, or partially disassembling the objective as is required by the previously described objectives. The apparatus disclosed in this patent includes an objective having a two part housing, the upper part being adapted to engage with the nosepiece of the microscope and the lower portion carrying the described lens assembly. The two portions of the housing are rotatable relative to each other and are locked in position relative to each other by means of a set screw provided on the side of the objective housing. Parfocality can be set or readjusted by loosening the locking screw and rotating the lower housing member relative to the upper housing member to the desired position and then retightening the locking screw to hold the adjusted position.

SUMMARY OF THE INVENTION

An objective having a housing formed of two generally tubular shaped members. The first member includes, adjacent one of its ends, structure for detachably securing the objective to, for instance, the rotatable nosepiece of a microscope. The second member is coaxial with and partially received within the first member. The second member is also slidable relative to the first member in a direction parallel to the longitudinal axis of the first member. The objective further includes apparatus for axially adjusting the position of the second member relative to the first member to parfocalize the objective. This apparatus includes a first portion rotatably mounted on the side of the first member and a second portion which cooperates with a surface provided on the second member. The axis of rotation of the axial adjustment member lies in a plane which is transverse to the longitudinal axis of the first member. Preferably, the second portion is a cylinder eccentrically mounted with respect to the axis of rotation of the axial adjustment member. Also, preferably, a spring is provided to insure engagement of the eccentric with the surface provided on the second or inner member. Finally, a locking mechanism and anti-rotation structure are provided.

BRIEF DESCRIPTION OF THE DRAWINGS

FIG. 3 is an enlarged view, looking in the direction of 3—3 in FIG. 1, showing the eccentric in one position; and FIG. 4 is a view similar to FIG. 3 showing the eccentric in another position.

DESCRIPTION OF THE PREFERRED EMBODIMENT

Figure 1:
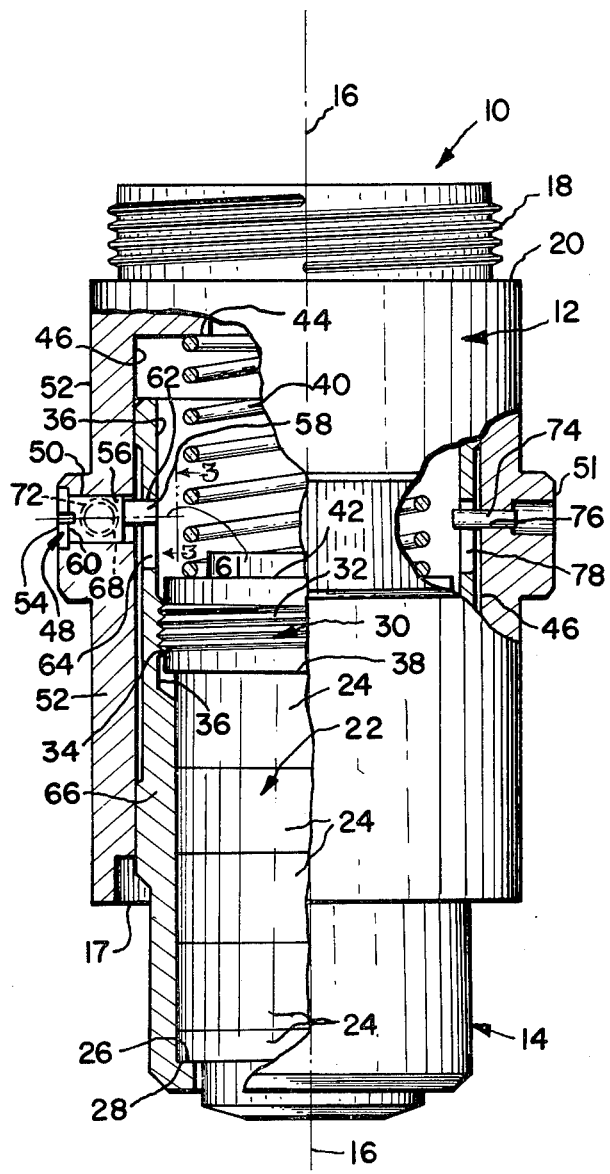
FIG. 1 is a side elevational view, partially broken away, showing an objective embodying the principles of the invention.

Objective 10, as illustrated in FIGS. 1–4, is adopted for use with an optical instrument, such as a microscope. The objective 10 has first and second tubular members 12 and 14. The first tubular member 12 includes a longitudinal axis 16. The second tubular member 14 is slidable and at least partially received within the open end 17 of first tubular member 12. At the other end of the first tubular member 12 there is a threaded area 18 which provides a means for detachable engagement with, for instance, a rotatable nosepiece of a microscope (not shown). A shoulder 20 is formed adjacent the threaded area 18 and is for engagement with a mating surface provided on the rotatable nosepiece of the aforementioned microscope.

A lens system 22 comprising a series of lenses (not shown) is positioned and supported within the second tubular member 14 by a series of lens cells 24. As viewed in FIG. 1, the lowermost cell 24 has a shoulder area 26 which is seated against a flange surface 28 of the second tubular member 14. A locking ring 30 having a series of external threads 32 formed thereon engages a complimenting series of internal threads 34 which are formed on interior surface 36 of the second tubular member 14. The locking ring 30 is screwed down in the second tubular member 14 until it engages a bearing area 38 on the upper most of the lens cells 24. The locking ring 30 is then tightened an appropriate amount so that the shoulder 26 is fully seated against flange surface 28 to correctly position the lenses. Depending upon such factors as the power and the optical design of the objective 10, one or more optical elements, such as lens 39, may be provided on the first tubular member 12.

As illustrated in FIG. 1, a helical spring 40 is seated on surface 42 of the locking ring 30 and extends therefrom to engage a surface 44 provided on the interior of the first tubular member 12. It will be appreciated that the helical spring 40 will exert a force between the surface 44 of the first tubular member 12 and the seat 42 of the locking ring 30 to thereby bias tubular members 12 and 14 away from each other.

Figure 2:
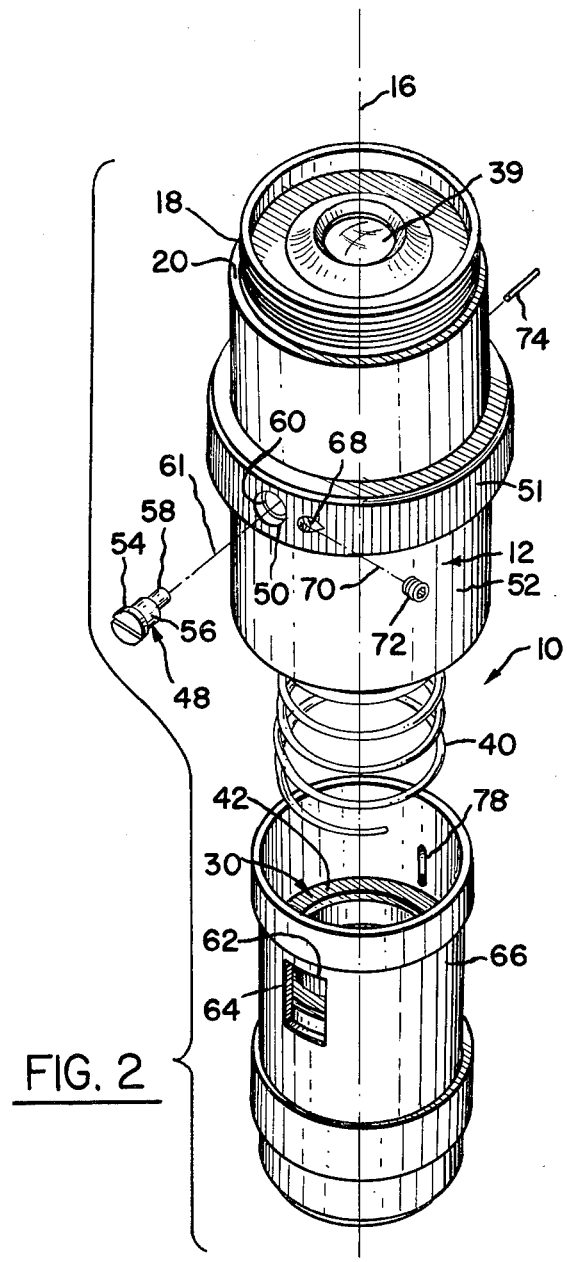
FIG. 2 is a partially exploded perspective view of the objective of FIG. 1.

A parfocality adjusting member 48, as best seen in FIGS. 1 and 2, is fitted to an accommodating aperture 50 which, preferably, is provided in the ring section 51 of the side portion 52 of the first tubular member 12. Ring section 51 is generally knurled to facilitate the screwing of objective 10 into the nosepiece of a microscope (not shown). The member 48 is, generally, comprised of a slotted head portion 54, an intermediate cylindrical portion 56 and an eccentric portion 58. The slotted head portion 54 is seated against surface 60 of the aperture 50. The intermediate cylindrical portion 56 is closely fitted to the aperture 50 for rotation about axis 61 of the aperture 50. The axis 61 lies in a plane which is perpendicular to the axis 16 of tubular member 12. The eccentric portion 58 extends from the intermediate cylindrical portion 56 to engage surface 62 of opening 64 which is formed in the side portion 66 of the second tubular member 14. With this arrangement, it will be seen that the second tubular member 14 is positionally held in place within the first tubular member 12 by the engagement of the eccentric portion 58 of the member 48 with the surface 62 of opening 64. The compression force of helical spring 40 biases surface 62 against the eccentric portion 58.

A threaded aperture 68, as best seen in FIG. 2, has its axis 70 angularly disposed to the axis 61 so that they will intersect each other. A set screw 72 is fitted to the threaded aperture 68 and is normally butted up against the cylindrical portion 56 of the member 48. When in engagement, member 48 is prevented from either rotating or moving laterally in the aperture 50.

As a precaution against the second tubular member 14 rotating within the first tubular member 12, a roll pin 74 is tightly fitted into aperture 76 which is formed in the first tubular member 12, as best seen in FIG. 1. The roll pin 74 extends beyond the interior surface 46 of the first tubular member 12 and toward the axis 16. Additionally, the roll pin 74 penetrates an elongated aperture 78 which is formed in the second tubular member 14. The diameter of the roll pin 74 is only slightly less than the width of the aperture 78. With this arrangement, rotation of the second tubular member 14 within the first tubular member 12 is prevented. However, because the length of the aperture 78 is longer than the length, in the axial direction, of opening 64 and because the aperture 78 is axially positioned on the side portion 66 so as to insure that the roll pin 74 does not make contact with either end of the aperture 78, inward retractability of the second tubular member 14 relative to the first tubular member 12 and operation of the adjusting member 48 is not hindered.

In order to achieve parfocality, the set screw 72 is loosened to a point where it no longer exerts a holding pressure against the intermediate cylindrical portion 56 of the member 48, as best seen in FIG. 4. Thereafter, the member 48 is rotated within the aperture 50 which in turns rotates the eccentric portion 58. As the helical spring 40 exerts pressure between the first tubular member 12 and the second tubular member 14, which holds the surface 62 of the opening 64 in firm engagement with the eccentric portion 58, rotation of the eccentric portion 58, as illustrated in FIGS. 3 and 4, causes the second tubular member 14 to move relative to the first tubular member 12, Accordingly, to adjust parfocality, while an operator is looking through the eyepiece of, for instance, a microscope (not shown), he slowly rotates the member 48 to cause movement of the second tubular member 14 within the first tubular member 12 to accurately focus on the viewed object. Once this is achieved the set screw 72 is moved back into engagement with the intermediate cylindrical 56 of the member 48. The member 48 is thereby kept from rotating within the aperture 50. The parfocality of the objective is, under normal circumstances, now permanently set and will never have to be reset as long as that objective is used with the optical instrument to which it has been parfocaled.

It is easily seen that any acceptable number of objectives of varying powers can be mounted to a rotating nosepiece of an optical instrument and that each could be easily parfocaled according to the principles of my invention as set forth herein. Once the individual objectives are parfocaled to the instrument it is no longer necessary for the operator to waste valuable time in refocusing every time a different powered objective is required. The operator may, at will, switch to any power objective without concern for whether or not the objective is in focus.

Although a preferred embodiment of this invention is shown and described, it should be understood that there are various modifications which could be made thereto without departing from the spirit or scope of the invention as defined in the following claims.

What is claimed is:

1. An objective comprising:
    a. a first generally tubular shaped member having a longitudinal axis, first and second ends and an intermediate side portion, said first member including means adjacent one of said ends for detachably securing said objective to, for instance, the nosepiece of a microscope;
    b. a second generally tubular shaped member coaxial with and at least partially and slidably received within said first member, said second member supporting; at least one optical element, said second member also including a slot elongated in the direction of said axis, said slot including a surface;
    c. means, supported between said first and second members, for urging said second member out of said first member;
    d. means for limiting the outward movement of said second member relative to said first member and for parfocalizing said objective by axially adjusting the outward position of said second member relative to said first member, said adjusting means including a first portion supported on said side portion of said first member and rotatable relative to said first member, said adjusting means further including a second portion received within said slot and held in engagement with said surface by said urging means when said second member is in said outward position, said second portion being out of engagement with said surface when said second member is moved into said first member independently of said adjusting means; and
    e. means, cooperable with said first portion of said adjusting means, for preventing said first portion of said adjusting means from rotaing, said rotation prevention means being supported on said first member.

2. The objective as set forth in claim 1 wherein said first portion of said adjusting means is cylindrical and rotates about an axis which lies in a plane transverse to said axis of said first member, said second portion of said adjusting means defining a cam surface relative to said axis of said first portion of said adjusting means.

3. The objective as set forth in claim 2 wherein said second portion of said adjusting means is a cylinder eccentrically mounted with respect to said axis of said first portion of said adjusting means.

4. The objective as set forth in claim 3 further including means for preventing rotation of said second member relative to said first member.

* * * * *

UNITED STATES PATENT AND TRADEMARK OFFICE
CERTIFICATE OF CORRECTION

PATENT NO. : 4,025,171
DATED : May 24, 1977
INVENTOR(S) : Theodore H. Peck

It is certified that error appears in the above-identified patent and that said Letters Patent are hereby corrected as shown below:

Col. 1, line 12, change "alingment" to --alignment--.

Col. 5, line 13, after "cylindrical" add --portion--.

Signed and Sealed this

Eleventh Day of October 1977

[SEAL]

Attest:

RUTH C. MASON
Attesting Officer

LUTRELLE F. PARKER
Acting Commissioner of Patents and Trademarks